May 18, 1943 W. B. FERRIS 2,319,222
FLUORESCENT DEVICE
Filed Dec. 22, 1941
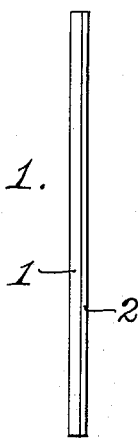
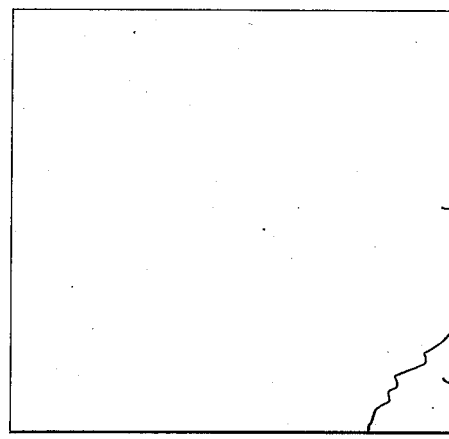
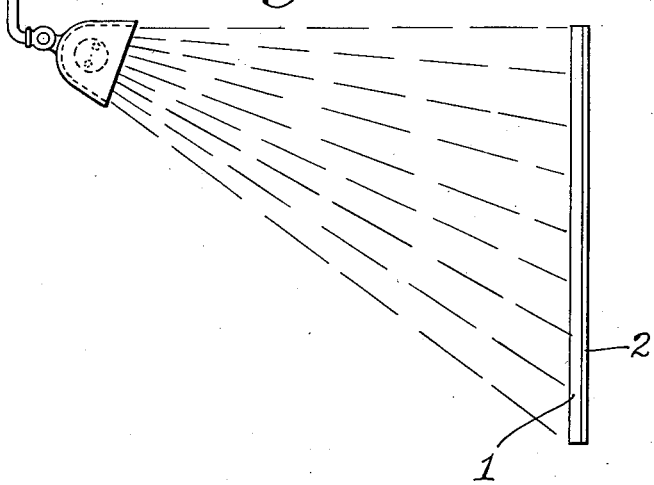
Inventor
Warren B. Ferris
by Parker & Carter
Attorneys.

Patented May 18, 1943

2,319,222

UNITED STATES PATENT OFFICE 2,319,222

FLUORESCENT DEVICE

Warren B. Ferris, Chicago, Ill.

Application December 22, 1941, Serial No. 423,901

4 Claims. (Cl. 250—81)

This invention relates to fluorescent devices and the method of making them and has for its object to provide a new and improved material of this description.

The invention has a further object to provide a fluorescent device which shall have a very high brilliance when ultra-violet light is directed upon it.

The invention has as a further object to provide a fluorescent device consisting of a plastic material impregnated with fluorescent material and formed into sheets or molded form and applying thereto a backing of white non-fluorescent material.

The invention has further objects which are more particularly pointed out in the accompanying description.

Referring now to the drawing,

Fig. 1 is an end view showing one form of a device embodying the invention;

Fig. 2 is a front view of a device embodying the invention;

Fig. 3 is a view of the fluorescent device showing the ultra-violet light directed thereon.

Like numerals refer to like parts throughout the several figures.

In carrying out the invention, I use a suitable plastic material preferably transparent or translucent and, while this material is in a plastic state, impregnating it with fluorescent material such as, for example, any of the Rhodamine series of dyes, the dye being thoroughly incorporated in the plastic material. This plastic material is then formed into the desired form such as sheets or any molded form.

There is then applied to the back or inner face of this plastic material a white non-fluorescent material.

In Figs. 1, 2 and 3, I have shown a sheet of material embodying the invention. In this construction there is a sheet 1 of plastic material impregnated with flurescent material and provided with a backing 2 of white non-fluorescent material.

I may use as the fluorescent material any of the Rhodamine series of dyes. The plastic material is thoroughly impregnated with the dye while the plastic material is in a soft condition. The plastic material is then hardened and formed into the desired shape, and there is applied to it a backing of white non-fluorescent material. This white non-fluorescent material may be applied as a sheet, fused to the plastic material. I may use as this backing any suitable white non-fluorescent material and have secured excellent results by the use of cellulose acetate or cellulose nitrate materials, or any other cellulose or other suitable plastic material.

This backing I have found greatly increases the fluorescent effect of the plastic material impregnated with fluorescent material when ultra-violet or near ultra-violet light is directed thereon. I have also found that splendid results are secured when the light vibrations are around 3620 Angstrom units. In other words, by providing this plastic material thoroughly impregnated with fluorescent material, such as one of the Rhodamine series of dyes, and applying this white non-fluorescent backing thereto, and directing ultra-violet or near ultra-violet light upon the plastic material impregnated with the fluorescent material, the fluorescent excitation or effect is greatly increased. This fluorescent device may be used in any place where such an effect is desirable.

This fluorescent device is particularly designed for use with the invisible purple haze lighting system for moving traffic under black-out conditions. When the device is used in blackouts on moving traffic elements and the invisible light is directed upon it from a great distance, this invisible light increases the fluorescent energy within the plane of the fluorescent sheet manifold so that the device can be seen and the element upon which it is placed can be located when many hundred feet away.

The white backing for the plastic material impregnated with fluorescent material is opaque.

I claim:

1. The method of making a fluorescent device for use at a distance from a source of ultra-violet light, comprising impregnating plastic material, while in a plastic condition, with fluorescent material and fusing a backing of white non-fluorescent cellulose material to said fluorescent material so that when ultra-violet light is directed upon said plastic material impregnated with fluorescent material, the fluorescent energy within the plane of the plastic material is greatly increased.

2. The method of making a fluorescent device for use at a distance from a source of ultra-violet light, comprising impregnating plastic material, while in a plastic condition, with a fluorescent Rhodamine dye, hardening the plastic material and bringing into contact therewith a backing of white non-fluorescent material from the group of cellulose acetate and cellulose nitrate and fusing the backing and the plastic material together to form a unitary structure so that, when ultra-violet light is directed upon said plastic material impregnated with fluorescent material, the fluorescent energy within the plane of the plastic material is greatly increased.

3. A fluorescent device for use at a distance from a source of ultra-violet light comprising a front member of plastic material impregnated with fluorescent material and back member of non-fluorescent white cellulose material, the two members being fused together to form a unitary structure so that, when ultra-violet light is directed upon said front member impregnated with fluorescent material, the fluorescent energy within the plane of the front member is greatly increased.

4. A fluorescent device for use at a distance from a source of ultra-violet light comprising a front member of plastic material impregnated with a fluorescent Rhodamine dye and a back member of white non-fluorescent material from the group of cellulose acetate and cellulose nitrate, the two members being fused together to form a unitary structure so that, when ultra-violet light from a distant point is directed upon said front member impregnated with fluorescent material, the fluorescent energy within the plane of the front member is greatly increased and the device can be seen and the element on which it is placed can be located from a distant point in the dark.

WARREN B. FERRIS.